(12) United States Patent
Watanabe et al.

(10) Patent No.: US 7,822,923 B2
(45) Date of Patent: Oct. 26, 2010

(54) STORAGE CONTROL PROGRAM, STORAGE CONTROL APPARATUS, AND STORAGE CONTROL METHOD

(75) Inventors: Takashi Watanabe, Kawasaki (JP); Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 11/806,521

(22) Filed: May 31, 2007

(65) Prior Publication Data

US 2008/0005501 A1      Jan. 3, 2008

(30) Foreign Application Priority Data

Jun. 30, 2006   (JP) ............... 2006-181117

(51) Int. Cl.
*G06F 12/00*   (2006.01)
(52) U.S. Cl. ............... 711/117; 711/113; 711/122
(58) Field of Classification Search ............... 711/117, 711/113, 122
See application file for complete search history.

(56) References Cited

U.S. PATENT DOCUMENTS 5,388,266 A * 2/1995 Frey et al. ............... 711/163
6,985,914 B2 * 1/2006 Venkatesh et al. ............... 707/200
7,181,578 B1 * 2/2007 Guha et al. ............... 711/154
7,275,134 B2 * 9/2007 Yang et al. ............... 711/122

FOREIGN PATENT DOCUMENTS

| WO | WO/03/065195 | 8/2003 |
|---|---|---|
| WO | WO/03/075147 | 9/2003 |
| WO | WO/2004/027625 | 4/2004 |

* cited by examiner

*Primary Examiner*—Brian R Peugh
*Assistant Examiner*—Hashem Farrokh
(74) *Attorney, Agent, or Firm*—Fujitsu Patent Center (57) ABSTRACT

There is provided a storage control program, a storage control apparatus, and a storage control method capable of improving a random read performance for a logging operation.

A storage control program allows a computer to control a storage apparatus and causes the computer to execute: a data write step that logs data to the storage apparatus based on a write request from outside; and a position information control step that can write position information in a cache apparatus connected to the computer through a network. The position information is equivalent to correspondence between a logical position specified by the write request and a physical position in the storage apparatus where the data write step logs data.

16 Claims, 8 Drawing Sheets

STORAGE CONTROL PROGRAM, STORAGE CONTROL APPARATUS, AND STORAGE CONTROL METHOD

BACKGROUND OF THE INVENTION

1. Field of the Invention

The present invention relates to a storage control program, a storage control apparatus, and a storage control method for writing a log onto a storage apparatus.

2. Description of the Related Art

A hard disk causes a random access to be slower than a sequential access. Storage systems using hard disks are subject to the similar problem. Several methods are proposed to solve this problem.

A first method is to simply array a large number of disks for performing I/O operations in parallel and improving the performance. This method can be used to construct a large-scale RAID (Redundant Arrays of Inexpensive Disks) system and improve both IOPS (Input Output Per Second) and reliability of random access.

A second method is to use a cache. This method can be categorized into write through cache and write back cache. The write through cache uses the cache during reading. The write back cache uses the cache during reading and writing. These methods can be used with an increased cache capacity to increase a cache hit ratio and drastically improve the IOPS for random access.

The write back cache needs to save data in memory before writing the data to a disk, thus degrading the reliability. Multiplexing the cache may ensure the reliability but doubles the cache memory cost.

A random write will now be described.

The random write includes a method called a logging operation. The logging operation sequentially writes information about a logical position (address) and data for the random write. Data reading uses information in a position information table that indicates correspondence between logical and physical positions to read data for reproduction. In this manner, the random write can achieve a throughput comparable to that of the sequential access. The logging operation excels in the random write. The write through cache excels in the random read. A combination of the logging operation and the write through cache can provide preferable results in terms of the performance, reliability, and costs for the random access.

Conventional technologies related to the invention disclose a storage system that distributes a cache apparatus, a disk apparatus, and a control apparatus over a network to increase a cache memory area. (For example, see Patent Document 1: WO2003/065195, Patent Document 2: WO2003/075147, and Patent Document 3: WO2004/027625).

The combination of the logging operation and the write through cache is very effective but causes a problem specific to the logging method. Especially, a storage system based on the logging operation needs to manage a position information table that indicates the correspondence between a logical position, i.e., a write position used by a host, and a physical position, i.e., a write position for a low-order device (disk apparatus). Searching the position information table is time-consuming, thus degrading the reading performance in case of a cache miss. The position information table necessitates one-to-one correspondence between sectors and requires an extra space approximately $1/64$ to $1/512$ of a volume size.

SUMMARY OF THE INVENTION

The present invention has been made in consideration of the foregoing. It is therefore an object of the present invention to provide a storage control program, a storage control apparatus, and a storage control method capable of improving a random read performance for a logging operation.

To solve the above-mentioned problem, the present invention provides a storage control program for allowing a computer to control a storage apparatus. The program causes the computer to execute: a data write step that logs data to the storage apparatus based on a write request from outside; and a position information control step that can write position information in a cache apparatus connected to the computer through a network. The position information is equivalent to correspondence between a logical position specified by the write request and a physical position in the storage apparatus where the data write step logs data.

In the storage control program according to the invention, the position information control step can further read, from the position information stored in the cache apparatus, based on a read request from outside, a physical position corresponding to a logical position specified by the read request. The program can further allow a computer to execute a data read step that reads data from a physical position read by the position information control step.

In the storage control program according to the invention, the position information control step uses a cache in the computer and a cache in the cache apparatus as a first hierarchical storage apparatus and manages the position information in the first hierarchical storage apparatus. The cache in the cache apparatus has a larger capacity than the cache in the computer.

In the storage control program according to the invention, the position information control step writes most recent position information to the cache in the computer and moves less frequently used position information from position information stored in the cache in the computer to the cache in the cache apparatus.

In the storage control program according to the invention, the position information control step adds the storage apparatus to the first hierarchical storage apparatus to provide a first hierarchical storage apparatus and uses the first hierarchical storage apparatus to manage the position information. The storage apparatus has a larger capacity than the cache in the cache apparatus.

In the storage control program according to the invention, the position information control step moves less frequently used position information from position information stored in the cache in the cache apparatus to the storage apparatus.

In the storage control program according to the invention, the data write step uses the cache in the computer, the cache in the cache apparatus, and the storage apparatus as a second hierarchical recording medium, and writes data to the second hierarchical recording medium by means of write through. The data read step reads data from the second hierarchical recording medium. The cache in the cache apparatus has a larger capacity than the cache in the computer and the storage apparatus has a larger capacity than the cache in the cache apparatus.

The invention provides a storage control apparatus for controlling a storage apparatus. The storage control apparatus includes: a data control section that logs data to the storage apparatus based on a write request from outside; and a position information control section that can write position information to a cache apparatus connected to the storage control apparatus through a network, in which the position information is equivalent to correspondence between a logical position specified by the write request and a physical position in the storage apparatus where the data control section logs data.

In the storage control apparatus according to the invention, the position information control section can further read, based on a read request from outside, from the position information stored in the cache apparatus, a physical position corresponding to a logical position specified by the read request. The data control section further reads data from a physical position read by the position information control section.

In the storage control apparatus according to the invention, the position information control section uses a cache in the storage control apparatus and a cache in the cache apparatus as a first hierarchical storage apparatus and manages the position information in the first hierarchical storage apparatus. The cache in the cache apparatus has a larger capacity than the cache in the storage control apparatus.

In the storage control apparatus according to the invention, the position information control section writes most recent position information to the cache in the computer and moves less frequently used position information from position information stored in the cache in the storage control apparatus to the cache in the cache apparatus.

In the storage control apparatus according to the invention, the position information control section adds the storage apparatus to the first hierarchical storage apparatus to provide a first hierarchical storage apparatus and uses the first hierarchical storage apparatus to manage the position information. The storage apparatus has a larger capacity than the cache in the cache apparatus.

In the storage control apparatus according to the invention, the position information control section moves less frequently used position information from position information stored in the cache in the cache apparatus to the storage apparatus.

In the storage control apparatus according to the invention, the data control section uses the cache in the storage control apparatus, the cache in the cache apparatus, and the storage apparatus as a second hierarchical recording medium, and writes data to and reads data from the second hierarchical recording medium by means of write through. The cache in the storage control apparatus is faster than the cache in the cache apparatus. The cache in the cache apparatus is faster than the storage apparatus.

The invention provides a storage control method of controlling a storage apparatus. The method executes: a data write step that logs data to the storage apparatus based on a write request from outside; and a position information control step that can write position information in a cache apparatus connected to the computer through a network, wherein the position information is equivalent to correspondence between a logical position specified by the write request and a physical position in the storage apparatus where the data write step logs data.

The invention can improve a random read performance for a logging operation, especially in case of a cache miss.

DETAILED DESCRIPTION OF THE PREFERRED EMBODIMENTS

Embodiments of the present invention will be described in further detail with reference to the accompanying drawings.

First Embodiment

The embodiment describes a storage control apparatus using the combination of the logging operation and the write through cache as mentioned above.

The following first describes the configuration of a storage system using the storage control apparatus according to the embodiment.

Figure 1:
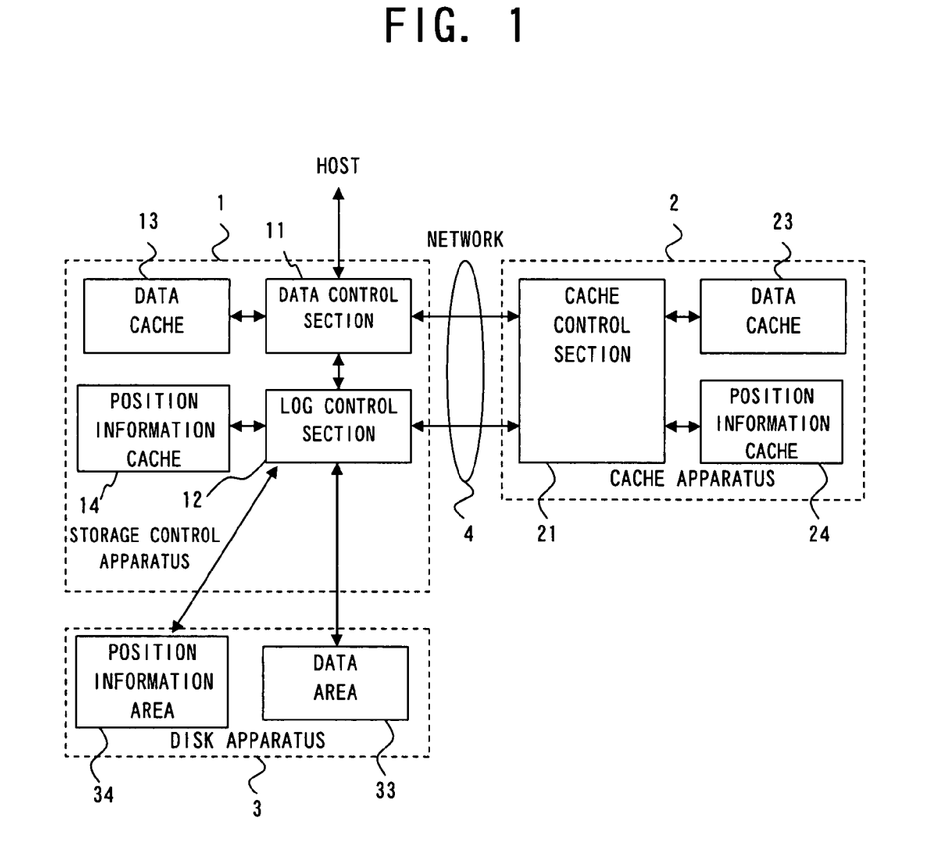
FIG. 1 is a block diagram exemplifying the configuration of a storage system according to a first embodiment.

FIG. 1 is a block diagram exemplifying the configuration of the storage system according to the embodiment. The storage system includes a storage control apparatus 1, a cache apparatus 2, a disk apparatus 3 (storage apparatus), and a network 4. The storage control apparatus 1 is connected to a host in the outside and the disk apparatus 3. The storage control apparatus 1 is connected to the cache apparatus 2 via the network 4.

The storage control apparatus 1 includes a data control section 11, a log control section 12 (position information control section), a data cache 13, and a position information cache 14. The data cache 13 may be provided in the data control section 11. The position information cache 14 may be provided in the log control section 12.

The cache apparatus 2 includes a cache control section 21, a data cache 23, and a position information cache 24. The cache control section 21 controls the data cache 23 and the position information cache 24. The data cache 23 uses larger memory than the data cache 13. The position information cache 24 uses larger memory than the position information cache 14. The data cache 23 and the position information cache 24 may be configured as single memory.

The disk apparatus 3 includes a data area 33 for storing logged data and a position information area 34 for storing position information.

The data control section 11 controls the data cache 13 in the storage control apparatus 1 and the data cache 23 in the cache apparatus 2. The data control section 11 follows a read or write request from the host, issues a read or write request to the log control section 12, and returns a result to the host. The log control section 12 controls the position information cache 14 in the storage control apparatus 1 and the position information cache 24 in the cache apparatus 2. The log control section 12 converts data for a write request from the data control section 11 into a log format and writes it to the data area 33 of the disk apparatus 3. When receiving a read request from the data control section 11, the log control section 12 reads the requested data from the data area 33 of the disk apparatus 3 and transmits the data to the data control section 11.

The data control section 11 manages the data caches 13 and 23, and the data area 33 as hierarchical storages and stores data in them. In terms of data access, the data cache 13 features a smallest capacity and a fastest speed and stores most frequently used data. The data cache 23 features a larger capacity and a slower speed and stores less frequently used data than the data cache 13. The data area 33 features a largest capacity and a slowest speed and stores least frequently used data.

Similarly, the log control section 12 manages the position information caches 14 and 24, and the position information area 34 as hierarchical storages and stores a position information table in each of them. In terms of access to the position information table, the position information cache 14 features a smallest capacity and a fastest speed and stores most frequently used position information. The position information cache 24 features a larger capacity and a slower speed and stores less frequently used position information than the position information cache 14. The position information area 34 features a largest capacity and a slowest speed and stores least frequently used position information.

The position information table will now be described.

Figure 2:
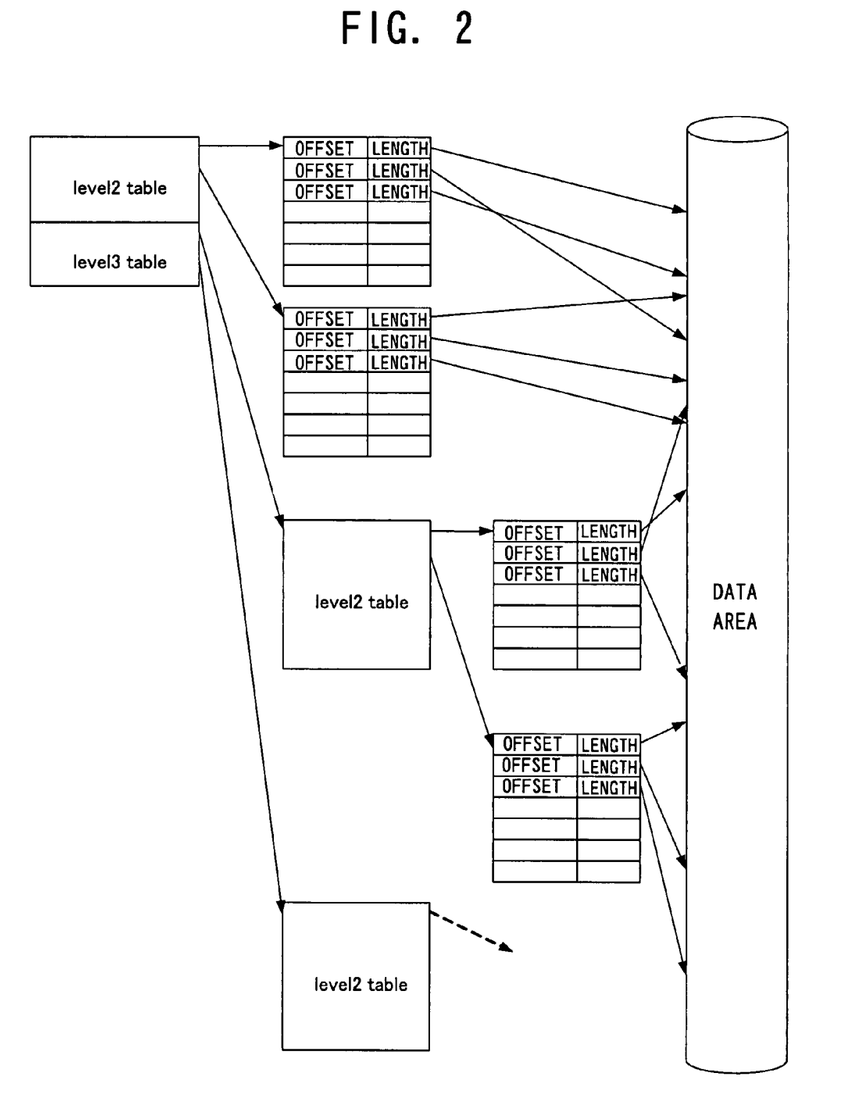
FIG. 2 is a block diagram exemplifying the configuration of a position information table according to the first embodiment.

The management of the position information table uses the same method as that for a file system's block map. FIG. 2 is a block diagram exemplifying the configuration of the position information table according to the embodiment. As shown in FIG. 2, the position information table contains two or three levels of indirect tables that represent position information about the correspondence between a logical position used by the host and a physical position in the data area 33. The log control section 12 searches a logical position in the table shown at the left end of FIG. 2 for a physical position shown at the right end thereof. The use of the position information table can fast update or reference part of data in the data area 33. A large volume can be managed.

A write process will now be described.

Figure 3:
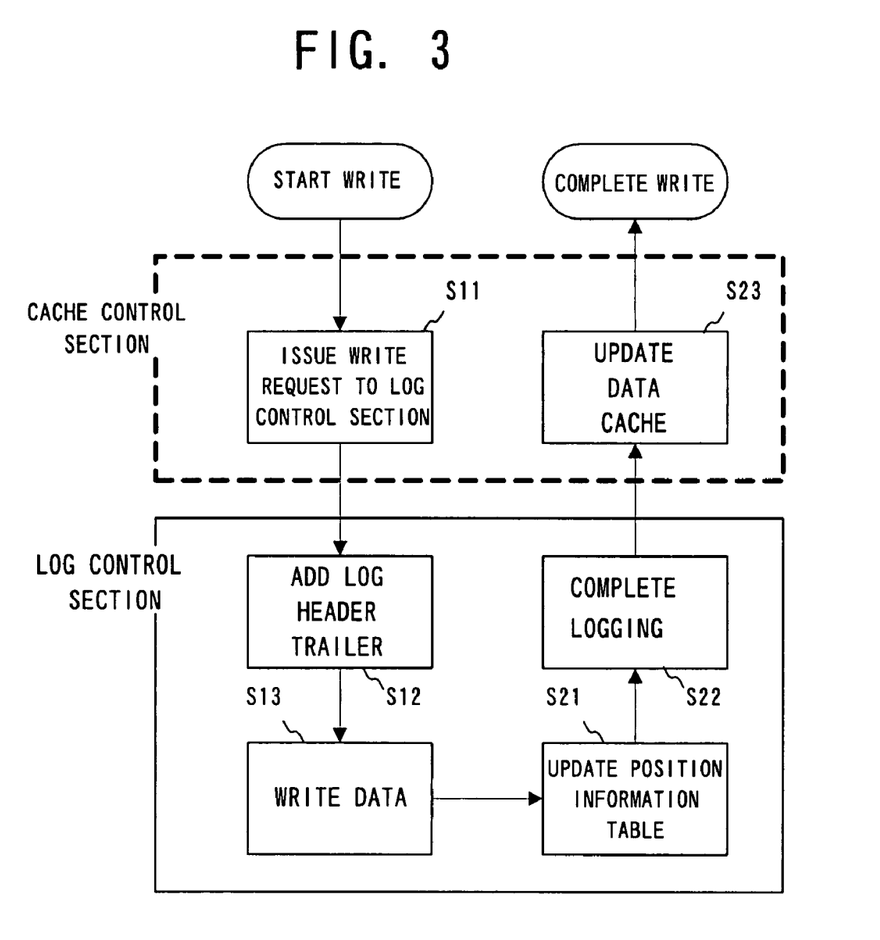
FIG. 3 is a flowchart exemplifying operations of a write process on a storage control apparatus according to the first embodiment.

Since the write through cache is used, the data control section 11 writes data not only to data caches 13 and 23 but also to the disk apparatus 3 during the write process. FIG. 3 is a flowchart exemplifying operations of the write process on the storage control apparatus according to the embodiment.

The data control section 11 receives a write request from the host and issues the write request to the log control section 12 (S11). The log control section 12 creates a header and a trailer for data corresponding to the write request received from the data control section 11 (S12). The log control section 12 writes the header, the data, and the trailer as a log format to the data area 33 of the disk apparatus 3 (S13).

The log control section 12 updates the position information table (S21) and notifies the data control section 11 of the write completion (S22). The data control section 11 receives the notification about the write completion from the log control section 12, and then updates the data caches 13 an 23 (S23) to terminate the flow.

A read process will now be described.

Figure 4:
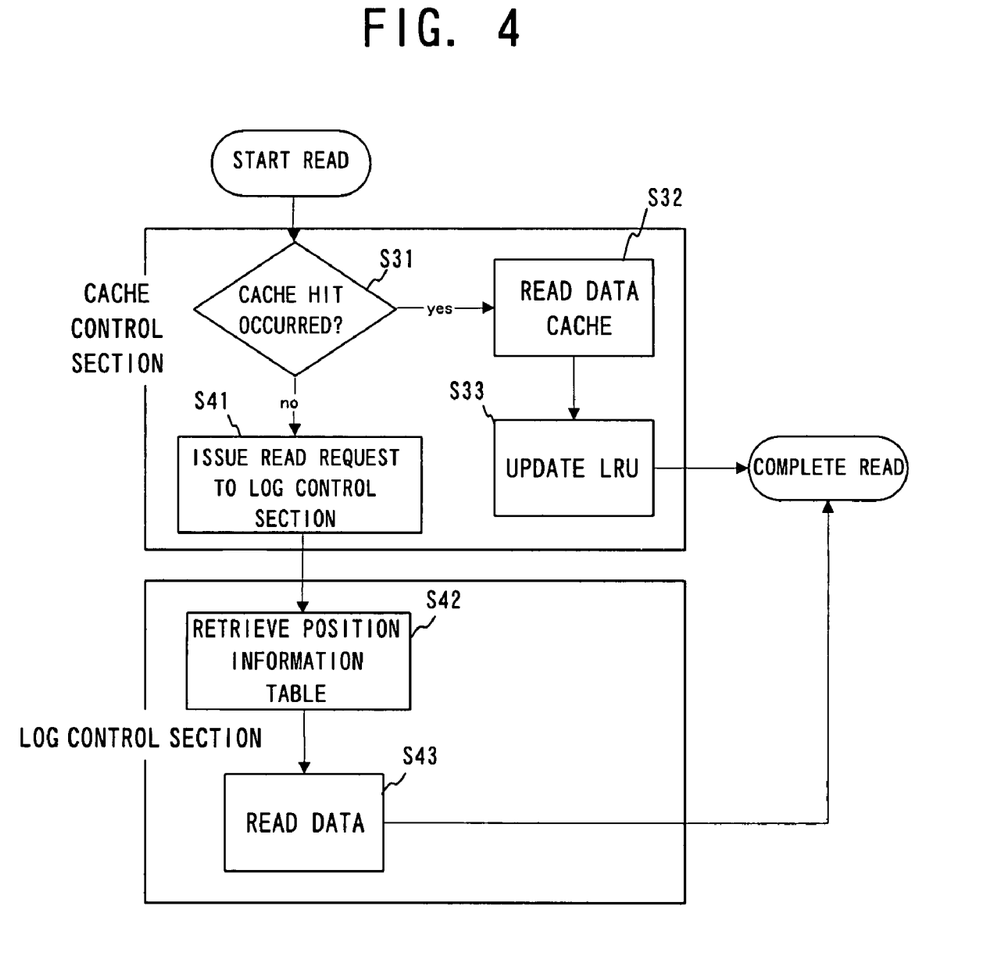
FIG. 4 is a flowchart exemplifying operations of a read process on the storage control apparatus according to the first embodiment.

When a cache hit occurs in the data cache 13 or 23 during a read process, the storage control apparatus 1 returns data in the cache to the host. When a cache miss occurs, the storage control apparatus 1 returns data in the disk apparatus 3 to the host. FIG. 4 is a flowchart exemplifying operations of the read process on the storage control apparatus according to the embodiment.

The data control section 11 receives a read request from the host and determines whether or not the data requested from the host is hit in the data cache 13 or 23 (S31). When a cache hit occurs (yes at S31), the data control section 11 reads the requested data from the hit data cache and transmits the data to the host (S32). The data control section 11 updates LRU information in the hit data cache (S35) to terminate the flow. The data control section 11 uses the LRU in the data cache 13 to move less frequently used data from the data cache 13 to the data cache 23. Similarly, the data control section 21 uses the LRU in the data cache 23 to move less frequently used data from the data cache 23 to the data area 33.

When a cache miss occurs (no at S31), the data control section 11 issues a read request to the log control section 12 (S41). The log control section 12 performs a retrieval process to retrieve a physical position on the disk apparatus 3 from a logical position of the data specified in the position information table of the position information cache 24 (S42). The log control section 12 reads data at the retrieved physical position and transmits the data to the host (S43) to terminate the flow.

The following describes the retrieval process (S42) for the position information table during the write process and the update process (S21) for the same during the read process in detail.

According to the embodiment, the log control section 11 controls all the position information tables in the position information caches 14 and 24, and the position information area 34. The log control section 12 communicates with the cache control section 21 to operate the position information cache 24. For this communication, the log control section 12 uses the cache protocol as disclosed in patent document 3.

Figure 5:
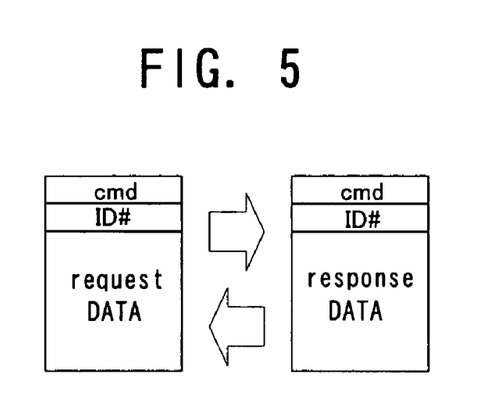
FIG. 5 exemplifies a message structure in a cache protocol according to the first embodiment.

FIG. 5 exemplifies a message structure in the cache protocol according to the embodiment. A request message is transmitted from the data control section 11 or the log control section 12 to the cache control section 21 and contains a command, an ID, and request (req) data. As a result of the request message, a response message is transmitted from the cache control section 21 to the data control section 11 and the log control section 12 and contains a command, an ID, and response (res) data.

Figure 6:
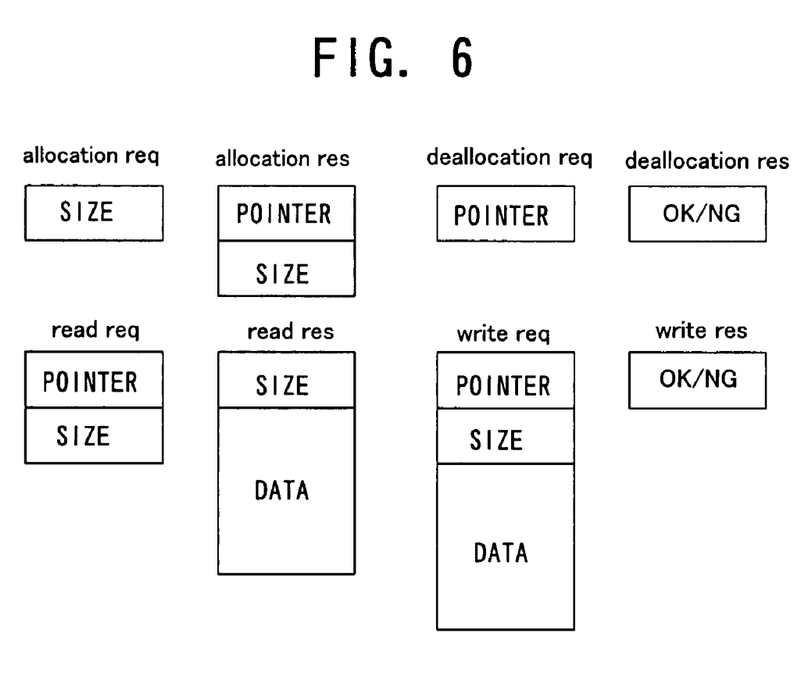
FIG. 6 exemplifies a data structure in the cache protocol according to the first embodiment.

FIG. 6 exemplifies a data structure in the cache protocol according to the embodiment. Allocation request data contains a size to be allocated. Allocation response data for the allocation request data contains a pointer to the allocated position and a size. Deallocation request data contains a pointer to a position to be deallocated. Deallocation response data for the deallocation request data indicates whether or not the deallocation is successful. Read request data contains a pointer to a position to read and a size. Read response data for the read request data contains the read size and data. Write request data contains a pointer to a position to write, a size, and data. Write response data for the write request data indicates whether or not the write is successful.

Figure 7:
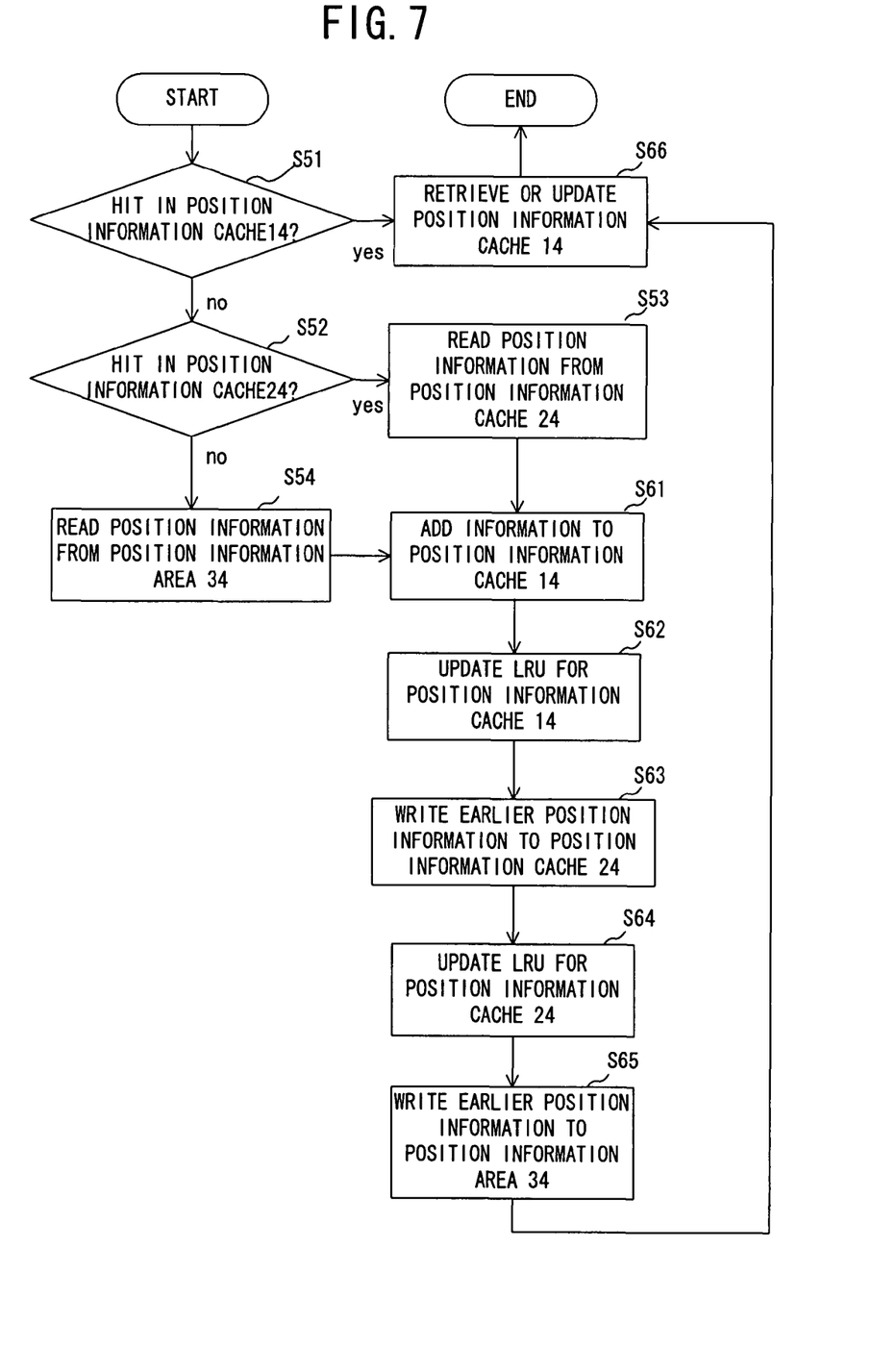
FIG. 7 is a flowchart exemplifying operations of retrieving and updating a position information table according to the first embodiment.

FIG. 7 is a flowchart exemplifying operations of retrieving and updating the position information table according to the embodiment. The log control section 12 receives a write request (during the update process) or a read request (during the retrieval process) from the data control section 11. The log control section 12 then determines whether or not the requested data hits in the position information table of the position information cache 14 that is the fastest local cache (S51).

When a cache hit occurs (yes at S51), control proceeds to step S66. When a cache miss occurs (no at S51), the log control section 12 determines whether or not the cache hit occurs in the position information cache 24 (S52). When the cache hit occurs (yes at S52), the log control section 12 reads the corresponding position information from the position information cache 24 (S53). Control proceeds to step S61. The log control section 12 issues a read request to the cache control section 21. The cache control section 21 issues a read response to the log control section 12. When the cache miss occurs (yes at S52), the log control section 12 reads the corresponding position information from the position information area 34 (S54). Control proceeds to step S61.

The log control section 12 additionally writes the position information read at step S53 or S54 to the position information cache 14 (S61). The log control section 12 updates LRU (Least Recently Used) information for the position information cache 14 (S62). The log control section 12 uses the LRU for the position information cache 14 to write position information earlier than a specified time to the position information cache 24 (S63). The log control section 12 issues an allocation request to the cache control section 21. The cache control section 21 issues an allocation response to the log control section 12.

The cache control section 21 updates the LRU for the position information cache 24 (S64). The log control section 12 uses the LRU for the position information cache 24 to write position information earlier than a specified time to the position information area 34 (S65). The log control section 12 issues a read request to the cache control section 21. The cache control section 21 issues a read response to the log control section 12. The log control section 12 issues a deallocation request to the cache control section 21. The cache control section 21 issues a deallocation response to the log control section 12. The log control section 12 performs retrieval in the position information cache 14 and updates the position information table when needed (S66). The process flow then terminates.

According to the embodiment, the log control section 12 in the storage control apparatus 1 hierarchically manages the position information tables for the position information cache 14 in the storage control apparatus 1, for the position information cache 24 in the cache apparatus 2, and for the position information area 34 in the disk apparatus 3. In this manner, it is possible to improve the performance of retrieving physical positions on the disk apparatus 3 during a random read and the performance of the random read for the logging operation.

Second Embodiment

The following first describes the configuration of the storage system using the storage control apparatus according to the second embodiment. The storage system according to the second embodiment has the same configuration as the first embodiment. Both embodiments differ from each other in operations of the data control section 11 and the log control section 12.

The following describes operations of the storage control apparatus according to the second embodiment. The write and read operations for the second embodiment equal those for the first embodiment. Both embodiments differ from each other in the contents of the retrieval process (S42) for the position information table during the write process and the update process (S21) for the same during the read process.

The following describes the retrieval process (S42) for the position information table during the write process and the update process (S21) for the same during the read process in detail.

According to the embodiment, the log control section 12 manages the position information cache 14. The cache control section 21 manages the position information cache 24 and the position information area 34. The log control section 12 and the cache control section 21 communicate with each other to operate the position information cache 24 and the position information area 34. For this communication, the log control section 12 and the cache control section 21 use the cache protocol according to the first embodiment provided with an additional protocol for table operations.

Figure 8:
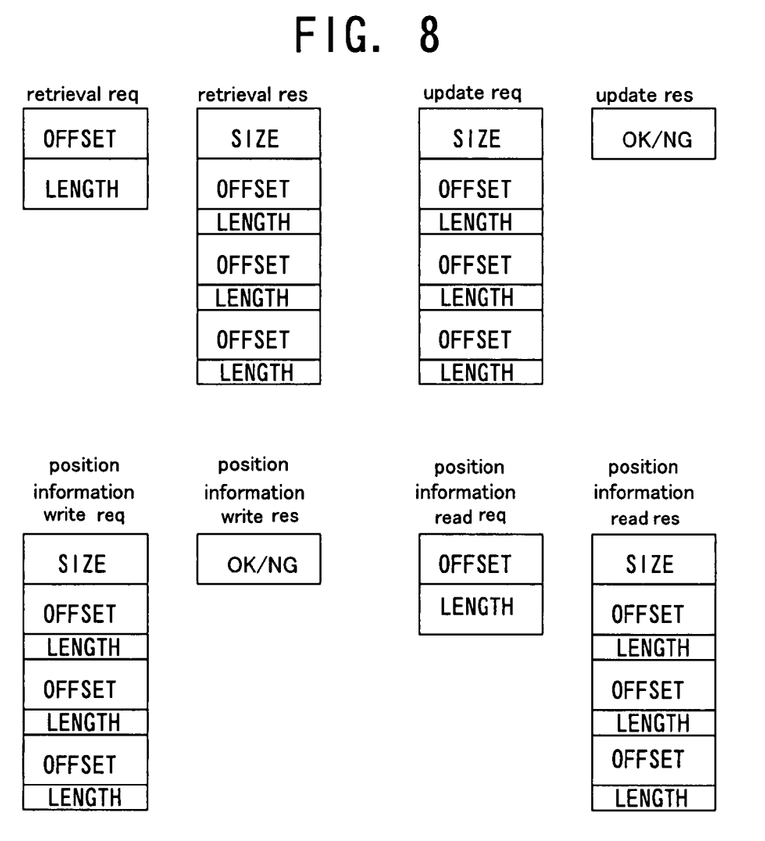
FIG. 8 exemplifies a data structure in a cache protocol according to a second embodiment.

FIG. 8 exemplifies a data structure in the cache protocol according to the second embodiment. Retrieval request data contains an offset indicating a logical position of targeted data and a length thereof. Retrieval response data contains a size indicating the number of blocks in a retrieval result, an offset indicating a physical position of each block, and a block length. Update request data contains a size indicating the number of blocks in targeted data, an offset indicating a logical position of each block, and a block length. Update response data indicates a successful or unsuccessful result of the process in response to the update request.

Similarly to the update request, table writing request data contains a size indicating the number of blocks in targeted data, an offset indicating a logical position of each block, and a block length. Similarly to the update response, table writing response data indicates a successful or unsuccessful result of the process in response to the table writing request. Similarly to the retrieval request, table reading request data contains an offset indicating a logical position of targeted data and a length thereof. Similarly to retrieval response, table reading response data contains a size indicating the number of blocks in a read result, an offset indicating a physical position of each block, and a block length.

Figure 9:
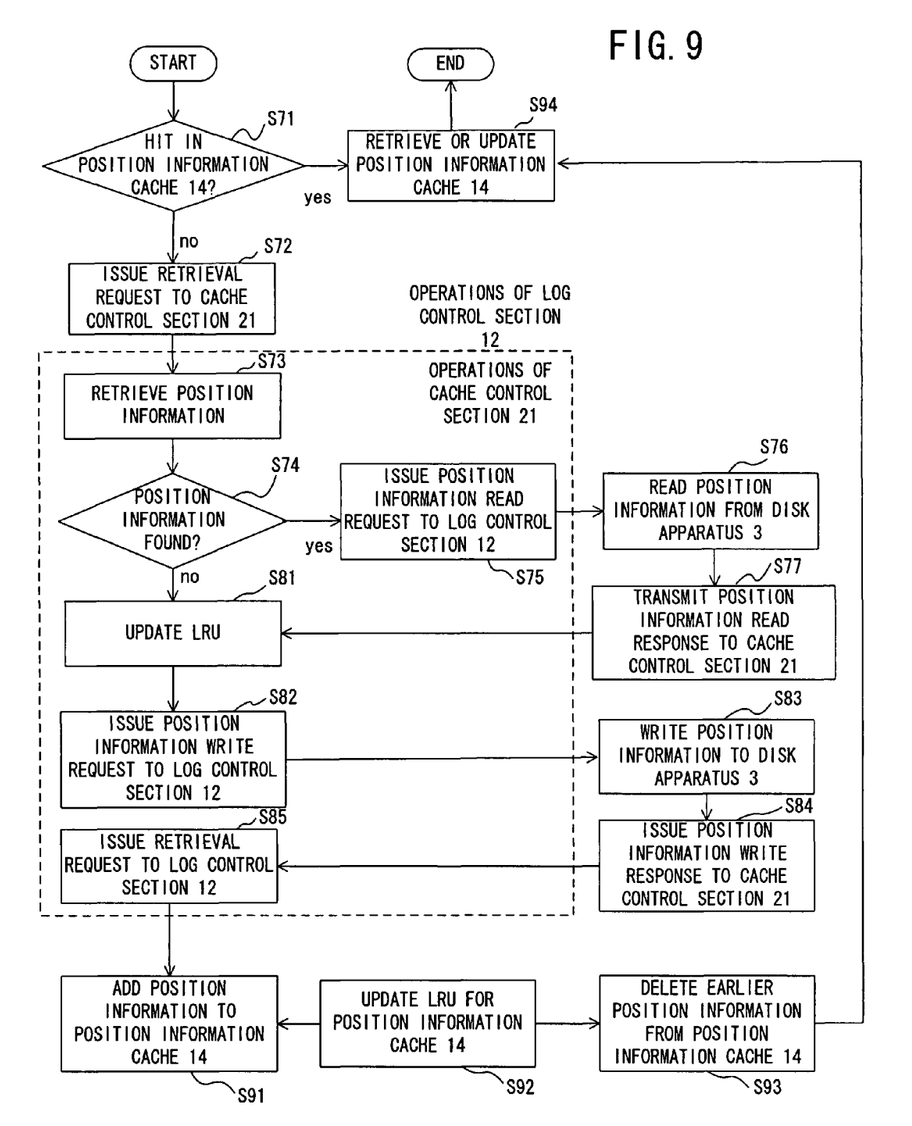
FIG. 9 is a flowchart exemplifying operations of retrieving and updating a position information table according to the second embodiment.

FIG. 9 is a flowchart exemplifying operations of retrieving and updating the position information table according to the embodiment. In FIG. 9, operations of the cache control section 21 are shown inside a dashed frame. Operations of the log control section 12 are shown outside the frame. The data control section 11 issues a write request (during the update process) or a read request (during the retrieval process). The log control section 12 determines whether or not the requested position information hits in the position information cache 14 (S71). When a cache hit occurs (yes at S71), control proceeds to step S94. When a cache miss occurs (no at S71), the log control section 12 issues a retrieval request to the cache control section 21 (S72). The retrieval request designates retrieval of the targeted position information in the position information cache 24.

The cache control section 21 retrieves the requested position information in the position information cache 24 according to the retrieval request (S73). The cache control section 21 determines whether or not the requested position information is found in the position information cache 24 (S74). When the requested position information is found (yes at S74), control proceeds to step S94. When the requested position information is not found (no at S74), the cache control section 21 issues a table read request to the log control section 12 (S75). The table read request designates to read the requested position information from the position information area 34. The log control section 12 reads the requested position information from the position information area 34 according to the table read request (S76). The log control section 12 transmits the read position information as a table read response to the cache control section 21 (S77).

The cache control section 21 updates the LRU for the position information cache 24 (S81). Using this LRU, the cache control section 21 issues a table write request to the log control section 12 (S82). The table write request designates to write position information earlier than a specified time from the position information cache 24 to the position information area 34. The log control section 12 writes the earlier information to the position information area 34 according to the table write request (S83). The log control section 12 issues a table write response indicating the write completion (S84). The cache control section 21 transmits the acquired position information as a retrieval response to the log control section 12 (S85).

The log control section 12 adds the position information acquired from the retrieval response to the position information cache 14 (S91). The log control section 12 updates the LRU for the position information cache 14 (S92). Using this LRU, the log control section 12 deletes the position information earlier than a specified time from the position information cache 14 (S93). The log control section 12 performs retrieval in the position information cache 14 and updates the position information table when needed (S94). The process flow then terminates.

According to the embodiment, the log control section 12 hierarchically manages the position information cache 14 and the cache control section 21. Further, the cache control section 21 hierarchically manages the position information cache 14 and the position information area 34 to hierarchically use the position information area 34 in the disk apparatus 3. In this manner, it is possible to improve the performance of retrieving physical positions on the disk apparatus 3 during a random read and the performance of the random read for the logging operation.

According to the above-mentioned embodiments, the position information tables are written to the position information caches 14 and 24, and the position information area 34. The position information area 24 may be unnecessary when the position information cache 24 has a sufficient capacity.

A data write step corresponds to steps S11, S12, S13, S22, and S23 in the embodiment. A data read step corresponds to steps S31, S41, S32, S33, and S43 in the embodiment. A position information control step corresponds to steps S21 and S42 in the embodiment.

The storage control apparatus according to the embodiment can be easily applied to a storage system and can further improve its performance.

A program can execute the above-mentioned steps on a computer included in the storage control apparatus and can be provided as a storage control program. The program can be stored in a computer-readable recording medium and can be executed on the computer included in the storage control apparatus. The computer-readable recording medium includes: internal storages mounted in the computer such as ROM and RAM; portable storages such as a CD-ROM, flexible disk, DVD disk, magnetic optical disk, and IC card; and a database for storing computer programs, another computer and its database, and a transmission medium over a telecommunication line.

What is claimed is:

1. A computer storage medium containing therein a storage control program for allowing a computer to execute a process to control a storage apparatus, the process comprising:

logging data to the storage apparatus based on a write request from outside;

writing, as position information, correspondence between a logical position specified by the write request and a physical position in the storage apparatus where the data has been logged in the logging, in a cache apparatus connected to the computer through a network; and using, as a first hierarchical storage apparatus, a cache in the computer and a cache in the cache apparatus and managing the position information in the first hierarchical storage apparatus;

wherein the cache in the cache apparatus has a larger capacity than the cache in the computer.

2. The computer storage medium according to claim 1, wherein the position information writing writes most recent position information to the cache in the computer, and the managing moves less frequently used position information from the position information stored in the cache in the computer to the cache in the cache apparatus.

3. The computer storage medium according to claim 1, wherein the managing adds the storage apparatus to the first hierarchical storage apparatus to provide a new first hierarchical storage apparatus and manages the position information in the new first hierarchical storage apparatus, and the storage apparatus has a larger capacity than the cache in the cache apparatus.

4. The computer storage medium according to claim 3, wherein the managing moves less frequently used position information from the position information stored in the cache in the cache apparatus to the storage apparatus.

5. The computer storage medium according to claim 1, wherein the data writing uses, as a second hierarchical recording medium, the cache in the computer, the cache in the cache apparatus, and the storage apparatus, and writes data to the second hierarchical recording medium by means of write through, the data reading reads data from the second hierarchical recording medium, and the cache in the cache apparatus has a larger capacity than the cache in the computer and the storage apparatus has a larger capacity than the cache in the cache apparatus.

6. A storage control apparatus for controlling a storage apparatus, comprising:

a first data control section that logs data to the storage apparatus based on a write request from outside;

a position information control section that is operable to write, as position information, correspondence between a logical position specified by the write request and a physical position in the storage apparatus where the data has been logged in the logging, in a cache apparatus connected to the computer through a network, wherein the position information control section uses, as a first hierarchical storage apparatus, a cache in the computer and a cache in the cache apparatus, and manages the position information in the first hierarchical storage apparatus; and the cache in the cache apparatus has a larger capacity than the cache in the computer.

7. The storage control apparatus according to claim 6, wherein the position information control section writes most recent position information to the cache in the computer and moves less frequently used position information from the position information stored in the cache in the storage control apparatus to the cache in the cache apparatus.

8. The storage control apparatus according to claim 6,
wherein the position information control section adds the storage apparatus to the first hierarchical storage apparatus to provide a new first hierarchical storage apparatus and manages the position information in the new first hierarchical storage apparatus, and
the storage apparatus has a larger capacity than the cache in the cache apparatus.

9. The storage control apparatus according to claim 8,
wherein the position information control section moves less frequently used position information from the position information stored in the cache in the cache apparatus to the storage apparatus.

10. The storage control apparatus according to claim 6,
wherein the first data control section manages, as a second hierarchical recording medium, the cache in the storage control apparatus, the cache in the cache apparatus, and the storage apparatus and writes data to the second hierarchical recording medium by means of write through,
the second data control section reads data from the second hierarchical recording medium, and
the cache in the cache apparatus has a larger capacity than the cache in the storage control apparatus and the storage apparatus has a larger capacity than the cache in the cache apparatus.

11. A storage control method of controlling a storage apparatus, the method executing:
logging data to the storage apparatus based on a write request from outside;
writing, as position information, correspondence between a logical position specified by the write request and a physical position in the storage apparatus where the data has been logged in the logging, in a cache apparatus connected to the computer through a network;
using, as a first hierarchical storage apparatus, a cache in the computer and a cache in the cache apparatus and managing the position information in the first hierarchical storage apparatus;
wherein the cache in the cache apparatus has a larger capacity than the cache in the computer.

12. The storage control method according to claim 11,
wherein the position information writing writes most recent position information to the cache in the computer; and
the managing moves less frequently used position information from the position information stored in the cache in the computer to the cache in the cache apparatus.

13. The storage control method according to claim 11,
wherein the managing adds the storage apparatus to the first hierarchical storage apparatus to provide a new first hierarchical storage apparatus and manages the position information in the new first hierarchical storage apparatus, and
the storage apparatus has a larger capacity than the cache in the cache apparatus.

14. The storage control method according to claim 13,
wherein the managing moves less frequently used position information from the position information stored in the cache in the cache apparatus to the storage apparatus.

15. A system comprising:
a storage apparatus having a storage region that includes a first region for storing first data and a second region for storing second data indicating a physical position of the first data in the first region;
a cache memory from which data can be read at a faster speed than from the storage apparatus; and
a controller that makes data indicating a physical position of data selected from the first data stored in the first region based on a condition of use in the first storage region be stored into the cache memory;
wherein the controller reads data from the first region by using a physical position of data to be read which is stored in the second region when data indicating the physical position of the data to be read is not stored in the cache memory, and the controller uses a cache in the controller and a cache in the cache memory as a first hierarchical storage apparatus and manages, in the first hierarchical storage apparatus, a correspondence between the second data and the physical position of the first data in the first region;
wherein the cache in the cache memory has a larger capacity than the cache in the controller.

16. A computer storage medium containing therein a storage control program for allowing a computer to execute a process to control a storage apparatus which has a storage region including a first region for storing first data and a second region for storing second data indicating a physical position of the first data in the first region, the process comprising:
storing data indicating a physical position of data selected from the first data stored in the first region based on a condition of use in the first storage region into a cache memory from which data can be read at a faster speed than from the storage apparatus;
reading data from the first region by using a physical position of data to be read which is stored in the second region when data indicating the physical position of the data to be read is not stored in the cache memory; and
using, as a first hierarchical storage apparatus, a cache in the computer and a cache in the cache memory and managing, in the first hierarchical storage apparatus, a correspondence between the second data and the physical position of the first data;
wherein the cache in the cache memory has a larger capacity than the cache in the computer.

* * * * *